US007160615B2

(12) United States Patent
Iwaida et al.

(10) Patent No.: US 7,160,615 B2
(45) Date of Patent: *Jan. 9, 2007

(54) GRANULES FOR FORMATION OF AN ELECTRODE OF AN ELECTRIC DOUBLE LAYER CAPACITOR, MANUFACTURING METHOD THEREOF, ELECTRODE SHEET, POLARIZED ELECTRODE, AND ELECTRIC DOUBLE LAYER CAPACITOR USING A POLARIZED ELECTRODE

(75) Inventors: Manabu Iwaida, Saitama (JP); Shigeki Oyama, Saitama (JP); Kenichi Murakami, Saitama (JP); Kouki Ozaki, Aichi (JP); Masanori Tsutsui, Aichi (JP)

(73) Assignees: Honda Motor Co., Ltd., Tokyo (JP); Daido Metal Company Ltd., Aichi (JP)

( * ) Notice: Subject to any disclaimer, the term of this patent is extended or adjusted under 35 U.S.C. 154(b) by 185 days.

This patent is subject to a terminal disclaimer.

(21) Appl. No.: 10/721,754

(22) Filed: Nov. 26, 2003

(65) Prior Publication Data

US 2004/0170821 A1 Sep. 2, 2004

(30) Foreign Application Priority Data

Nov. 29, 2002 (JP) ......................... P. 2002-347939
Nov. 29, 2002 (JP) ......................... P. 2002-349229

(51) Int. Cl.
*B32B 5/16* (2006.01)

(52) U.S. Cl. ...................... 428/403; 428/407; 361/502; 361/503; 361/504; 361/507; 361/508; 361/509; 361/510; 361/511; 361/512; 361/513; 361/514; 361/515; 361/516; 361/517; 29/25.03

(58) Field of Classification Search ................ 428/403, 428/407; 361/502, 503–517; 28/25.03
See application file for complete search history.

(56) References Cited

U.S. PATENT DOCUMENTS 6,721,168 B1 * 4/2004 Takeuchi et al. ............ 361/502
6,778,379 B1 * 8/2004 Iwaida et al. ............... 361/502
6,831,826 B1 * 12/2004 Iwaida et al. ............... 361/502

FOREIGN PATENT DOCUMENTS

| | | |
|---|---|---|
| JP | 7-105316 | 11/1995 |
| JP | 9-293648 A | 11/1997 |
| JP | 2001-035756 | 2/2001 |
| JP | 2001-230158 A | 8/2001 |
| JP | 2001-237148 A | 8/2001 |
| JP | 2001-267187 | 9/2001 |

* cited by examiner

*Primary Examiner*—Leszek B. Kiliman
(74) *Attorney, Agent, or Firm*—Arent Fox PLLC

(57) ABSTRACT

An electrode sheet of an electric double layer capacitor is produced by using granules for formation of an electrode of an electric double layer capacitor which are obtained by kneading and then crushing materials including an activated material, a conductive filler, and a binder at 50 to 97 mass-%, 1 to 30 mass-%, and 2 to 20 mass-%, respectively, and which are essentially granules whose diameter is in a range of 47 to 840 μm.

A method for manufacturing a sheet-like electrode by mixing and kneading materials including an activated carbon, carbon black, and PTFE into a kneaded material, producing a forming material by converting the kneaded material into granules, and forming and rolling the forming material.

8 Claims, 7 Drawing Sheets

REUSE OF FINE GRANULES
REMOVAL AND REUSE OF LARGE GRANULES
REMOVAL OF FINE GRANULES
MATERIALS MIXING STEP (S1)
KNEADING STEP (S2)
CRUSHING STEP (S3)
CLASS-IFICATION STEP (S4)
FIRST FORMING STEP (S6)
ROLLING STEP (S7)
BONDING STEP (S8)

101
102
103
104
104
105
105

GRANULES FOR FORMATION OF AN ELECTRODE OF AN ELECTRIC DOUBLE LAYER CAPACITOR, MANUFACTURING METHOD THEREOF, ELECTRODE SHEET, POLARIZED ELECTRODE, AND ELECTRIC DOUBLE LAYER CAPACITOR USING A POLARIZED ELECTRODE

BACKGROUND OF THE INVENTION

The present invention relates to granules for formation of an electrode of an electric double layer capacitor, their manufacturing method, an electrode sheet, a polarized electrode, and an electric double layer capacitor using a polarized electrode.

Further, the present invention relates to a manufacturing method of a sheet-like polarized electrode for an electric double layer capacitor.

Electric double layer condensers (also called electric double layer capacitors) have farad-class large capacitance, are superior in the operating cycle characteristic, and can be charged quickly. For these reasons, electric double layer capacitors are used as backup power sources of electronic equipment and vehicular batteries (energy buffers) and for other purposes.

An electric double layer capacitor will be outlined below with reference to FIG. 4.

FIG. 4 is a sectional view showing the basic configuration of an electric double layer capacitor.

The electric double layer capacitor 101 shown in FIG. 4 is composed of a container 102 and a pair of carbon electrodes (polarized electrodes) 104 and a pair of collectors (collector members) 105 that are housed in the container 102. A separator 103 is interposed between the carbon electrodes 104. An ion-conductive electrolytic solution is provided in the container 102. The electric double layer capacitor 101 is a capacitor in which charges (indicated by "+" and "−" in the figure) that are generated at each of the boundaries between the carbon electrodes 104 (solids) and the electrolytic solution (liquid) and are separated from each other by a molecule-level distance are used as corresponding to a dielectric of an ordinary capacitor.

Electrolytic solutions used in electric double layer capacitors are generally classified into what is called water-soluble-type electrolytic solutions obtained by adding an electrolyte to dilute sulfuric acid and what is called organic electrolytic solutions obtained by adding an electrolyte to an organic solvent, and selection is made between these two types in accordance with a purpose. That is, electric double layer capacitors using a water-soluble-type electrolytic solution are low in internal resistance and hence are advantageous in terms of power density. On the other hand, organic electrolytic solutions can increase the breakdown voltage per unit cell and hence are advantageous in terms of energy density. Further, organic electrolytic solutions enable use of inexpensive and light metals such as aluminum.

In practice, as shown in FIG. 2, such electric double layer capacitors employ a laminated polarized electrode 9 (or 10) in which an electrode layer (electrode sheet) e and collector foil (metal foil) 11 (or 14) are bonded to each other via, if desired, a bonding layer.

As shown in FIGS. 1A and 1B, an electric double layer capacitor is formed by laminating the polarized electrodes 9 and 10 and a separator(s) s alternately and enclosing those in a container 2.

The electric double layer capacitor 1 of FIG. 1A is mainly composed of the cylindrical container 2, an electrode roll 3 that is a laminated body of the polarized electrodes 9 and 10 and the separators s and is housed in the container 2, and an electrolytic solution that is provided in the container 2 as a result of injection.

On the other hand, the electric double layer capacitor 1 of FIG. 1B is mainly composed of coin-type containers 2 and 2' and a laminated body that consists of the polarized electrodes 9 and 10 and the separator s and is housed in the containers 2 and 2'. The separator s is impregnated with an electrolytic solution.

Polarized electrodes to be used in electric double layer capacitors are required to have a porous structure. Further, since they are used for a long time in various forms, they are required not to be prone to cracks or damage and to be high in shape retention.

There may occur an event that granules or particles of the electrode material such as carbon of the electrodes desorb to cause a voltage decrease or increase in internal resistance and the desorbed granules or particles of the electrode material are suspended in the electrolytic solution or interposed between the separators to disable long-term maintenance of a prescribed voltage.

A method for preventing coming-off of electrode formation granules in an electric double layer capacitor is disclosed in patent document 1, for example. That is, patent document 1 discloses a manufacturing method for manufacturing a polarized electrode of an electric double layer capacitor by forming a mixture of electrode materials that are a carbon fine powder (activated carbon), a conductive filler, a binder, etc. and a liquid lubricant into a sheet, removing the lubricant, and rolling the formed sheet along one or a plurality of axes.

Patent document 2 discloses an electrode sheet for an electric double layer capacitor in which the tensile strength of a polarized electrode is set to 0.13 Pa to prevent carbon granules as part of an electrode from coming off into an electrolytic solution.

[Patent Document 1]
JP-B-7-105316

[Patent Document 2]
JP-A-2001-267187

Because electric double layer condensers (capacitors) have large capacitance and are superior in the operating cycle characteristic, studies are now being made to use those as various backup power sources of automobiles etc. When used as backup power sources of automobiles etc., electric double layer capacitors should have a large capacitance. Therefore, polarized electrodes used in such electric double layer capacitors should assume long, sheet-like shapes. And various manufacturing methods are proposed for such sheet-like polarized electrodes.

The following method is known though it does not directly relate to problems to be solved by the invention. Activated carbon as a carbonaceous powder, carbon black as a conductivity-enhancing agent, and a fluororesin (PTFE (polytetrafluoroethylene)) as a binder, and ethanol are mixed together with a mixer. A resulting mixture is dried and then kneaded with a kneader. A resulting kneaded material is crushed with a mixer into granules of 2 mm or less in diameter. The granules are pressure-formed with parallel rolls into a sheet-like formed body (refer to patent document 3, for example).

[Patent Document 3]

JP-A-2001-35756

However, in the case of polarized electrodes produced by the methods of patent documents 1 and 2, whereas the desorption of the granules themselves constituting the electrodes in a completed capacitor is prevented to some extent, in a process of manufacturing a polarized electrode or in manufacturing an electric double layer capacitor by enclosing polarized electrodes in a container fine particles of an active material, a conductive filler, etc. are peeled off or desorbed and then suspended in an electrolytic solution or interposed between separators, which leads to reduction in the voltage maintenance ratio.

Incidentally, in manufacture of the above type of sheet-like polarized electrode, it is desired that the sheet not be prone to porosities or cracks and be high in tensile strength.

SUMMARY OF THE INVENTION

An object of the invention is therefore to provide an electrode for an electric double layer capacitor having a large voltage maintenance ratio (i.e., a low degree of self-discharge) by preventing desorption of fine granules or particles of an active material, a conductive filler, etc.

The inventors found that a carbon fine powder or fine particles of a conductive filler etc. that are peeled off or desorbed in a process of manufacturing a polarized electrode or in manufacturing an electric double layer capacitor by enclosing polarized electrodes in a container are not only granules as part of the electrodes in a completed capacitor but also fine granules that are produced unavoidably in manufacturing electrode formation granules. The inventors have made the present invention by finding out that the above problem can be solved by using granules in a prescribed diameter range as a starting material for formation of an electrode of an electric double layer capacitor.

That is, the invention recited in aspect 1 is granules for formation of an electrode of an electric double layer capacitor which are obtained by kneading and then crushing materials including an activated material, a conductive filler, and a binder at 50 to 97 mass-%, 1 to 30 mass-%, and 2 to 20 mass-%, respectively, characterized in that the granules for formation of an electrode are essentially granules whose diameter is in a range of 47 to 840 μm.

Forming an electrode of an electric double layer capacitor by using, as a starting material, thus-produced granules for formation of an electrode of an electric double layer capacitor prevents the phenomenon that a carbon fine powder or fine particles of a conductive filler etc. are peeled off or desorbed and then suspended in an electrolytic solution or interposed between separators. This makes it possible to produce an electrode of an electric double layer capacitor that has a large voltage maintenance ratio.

The invention recited in aspect 2 is a manufacturing method of granules for formation of an electrode of an electric double layer capacitor, characterized by including the steps of:

(a) producing material lumps by kneading materials including an activated material, a conductive filler, and a binder at 50 to 97 mass-%, 1 to 30 mass-%, and 2 to 20 mass-%, respectively, and thereby fibrillating the binder;

(b) producing crushed granules by crushing the material lumps;

(c) classifying the crushed granules to remove granules whose diameters are larger than 840 μm; and (d) classifying the crushed granules to remove granules whose diameters are smaller than 47 μm.

This manufacturing method makes it possible to easily manufacture granules for formation of an electrode of an electric double layer capacitor that prevents the phenomenon that a carbon fine powder or fine particles of a conductive filler etc. are peeled off or desorbed and then suspended in an electrolytic solution or interposed between separators.

The above manufacturing method of granules for formation of an electrode of an electric double layer capacitor according to the invention means that either of the steps (c) and (d) may be executed first.

That is, fine granules may be removed (step (d)) after granules whose diameters are larger than a prescribed value are removed first (step (c)) from the crushed granules produced by step (b). Alternatively, granules whose diameters are larger than a prescribed value may be removed (step (c)) after fine granules are removed first (step (d)).

The invention recited in aspect 3 is an electrode sheet for an electric double layer capacitor which is produced by forming the granules for formation of an electrode of an electric double layer capacitor according to the invention into a sheet.

With the thus-configured electrode sheet, a carbon fine powder or fine particles of a conductive filler etc. are not peeled off or desorbed and then suspended in an electrolytic solution or interposed between separators. This makes it possible to produce an electrode of an electric double layer capacitor that has a large voltage maintenance ratio and hence can exhibit stable performance.

The invention recited in aspect 4 is a polarized electrode for an electric double layer capacitor wherein the electrode sheet for an electric double layer capacitor according to invention is laminated on collector foil with or without intervention of a bonding layer.

With the thus-configured polarized electrode for an electric double layer, a carbon fine powder or fine particles of a conductive filler etc. are not peeled off or desorbed and then suspended in an electrolytic solution or interposed between separators. Therefore, when it is incorporated in an electric double layer capacitor, a large voltage maintenance ratio can be attained. This makes it possible to produce an electric double layer capacitor that can supply a stable voltage and is highly durable.

The invention recited in aspect 5 is an electric double layer capacitor characterized by including the polarized electrode for an electric double layer capacitor according to the invention.

With this configuration, an electric double layer capacitor can be obtained that has a large voltage maintenance ratio and is highly durable.

Further, the present invention is made in view of the above circumstances, and an object of the invention is therefore to provide a manufacturing method of a sheet-like polarized electrode for an electric double layer capacitor which can minimize the probability that porosities or cracks develop in a sheet-like formed body and can manufacture a polarized electrode that is high in tensile strength.

To attain the above object, the invention recited in aspect 6 is a method for manufacturing a sheet-like polarized electrode for an electric double layer capacitor by mixing and kneading materials including a carbonaceous powder, a conductivity-enhancing agent, and a binder into a kneaded material, producing a forming material by converting the kneaded material into granules, and forming and rolling the forming material, wherein the granules as the forming material produced from the kneaded material are generally glomerate and are in a diameter range that the diameter is larger than or equal to 47 μm and smaller than 840 μm.

To manufacture a sheet-like polarized electrode having high sheet strength without causing porosities or cracks, the inventors diligently studied the shape, the diameter range, and other factors of granules as a forming material (i.e., a material to be formed) and found that it is preferable that the forming material satisfy the conditions of aspect 6.

First, it is preferable that the granules be generally glomerate and have no whisker-like projections. If the forming material had whisker-like projections, porosities or cracks would tend to develop when it is formed into a sheet and the resulting sheet would be liable to have low tensile strength. In contrast, in the case that the granules are generally glomerate and have no whisker-like projections, interstices are hardly prone to occur and hence porosities or cracks do not tend to develop and the tensile strength can therefore be made high.

Making the diameter of the granules of the forming material larger than or equal to 47 μm and smaller than 840 μm can stabilize its quality, make porosities or cracks even less prone to occur, and increase the tensile strength further. Inclusion of granules whose diameter is smaller than 47 μm or larger than or equal to 840 μm renders the quality unstable and makes the tensile strength prone to decrease.

Among the materials of a polarized electrode, the carbonaceous powder is mainly activated carbon and may be carbon nanotubes or fibrous carbon. Carbon black is mainly used as the conductivity-enhancing agent. It is preferable that the binder be a fluororesin as typified by PTFE.

The invention recited aspect 7 is characterized in that the granules as the forming material produced from the kneaded material are such that a proportion of granules whose diameter is smaller than 243 μm is smaller than or equal to 30% of all the granules. If the proportion of relatively small granules whose diameter is smaller than 243 μm exceeded 30%, the sheet tensile strength would decrease. It is preferable to set that proportion low.

The invention recited in aspect 8 is characterized in that when a binder-assisting agent is added to and mixed with the forming material before the forming material is formed into a sheet, the binder-assisting agent and the forming material are mixed with each other in a tightly closed container.

Mixing the binder-assisting agent and the forming material together in a tightly closed container prevents the binder-assisting agent from being thrown away and makes it possible to handle them without changing the content of the binder-assisting agent, as a result of which they can be mixed with each other with as high a degree of uniformity as possible. This in turn makes it possible to stabilize the quality of the forming material and to manufacture even better sheet-like polarized electrodes.

Examples of the binder-assisting agent are alcohol such as IPA (isopropyl alcohol), ethanol, and methanol, ether, ketone, etc.

DETAILED DESCRIPTION OF THE PREFERERED EMBODIMENTS

The present invention will be hereinafter described with reference to the accompanying drawings.

(Electric Double Layer Capacitor)

First, granules for formation of an electrode of an electric double layer capacitor, their manufacturing method, an electrode sheet, a polarized electrode, and an electric double layer capacitor using a polarized electrode according to the invention will be described with reference to FIGS. 1 and 2.

Figure 1A:
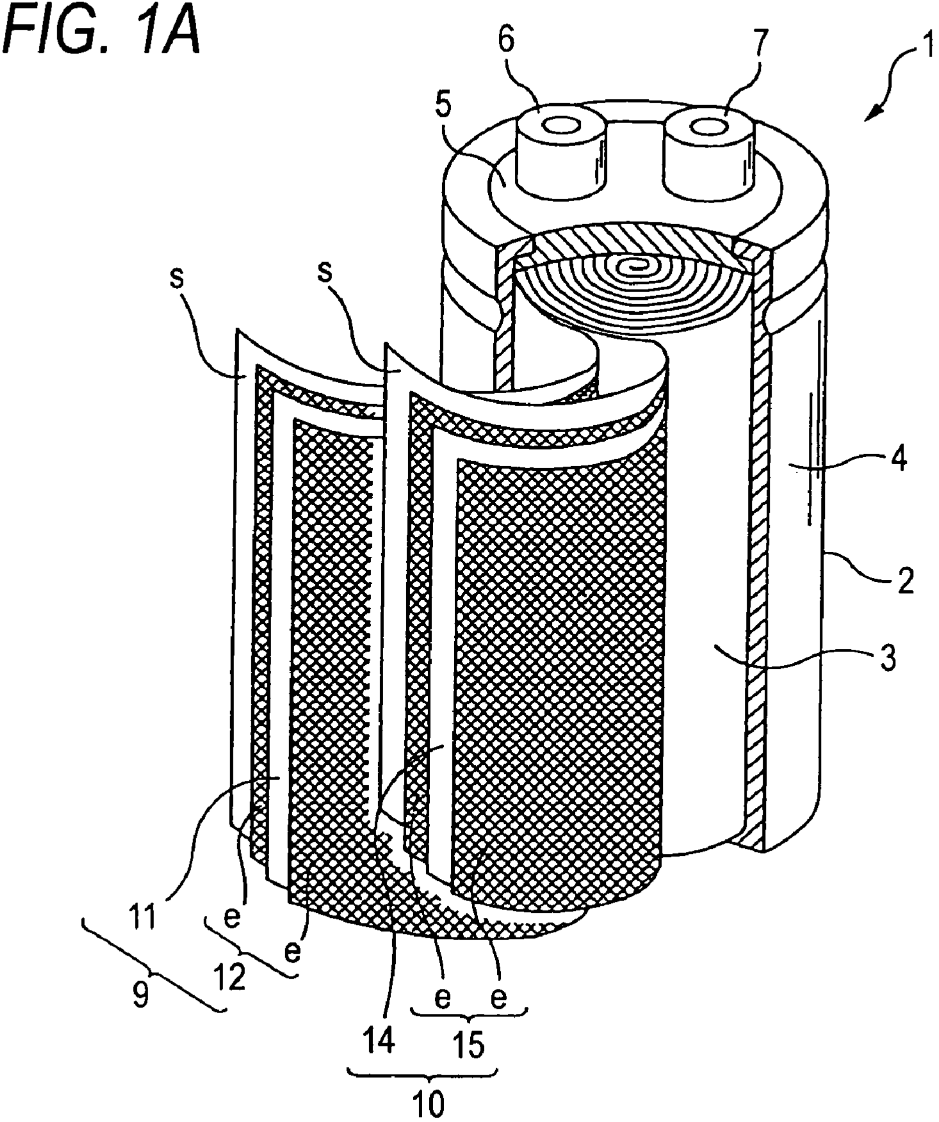
FIG. 1A is a schematic view of an exemplary electric double layer capacitor according to the invention or the prior art.
Figure 1B:
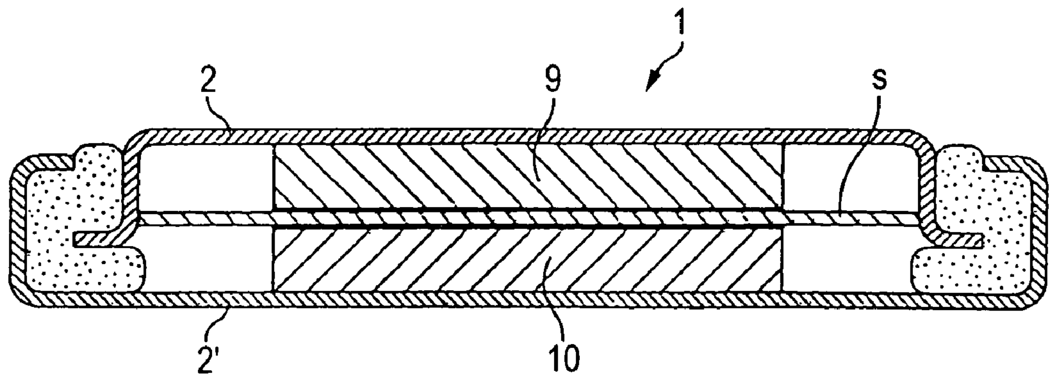
FIG. 1B is a schematic view of another electric double layer capacitor according to the invention or the prior art.
Figure 2A:
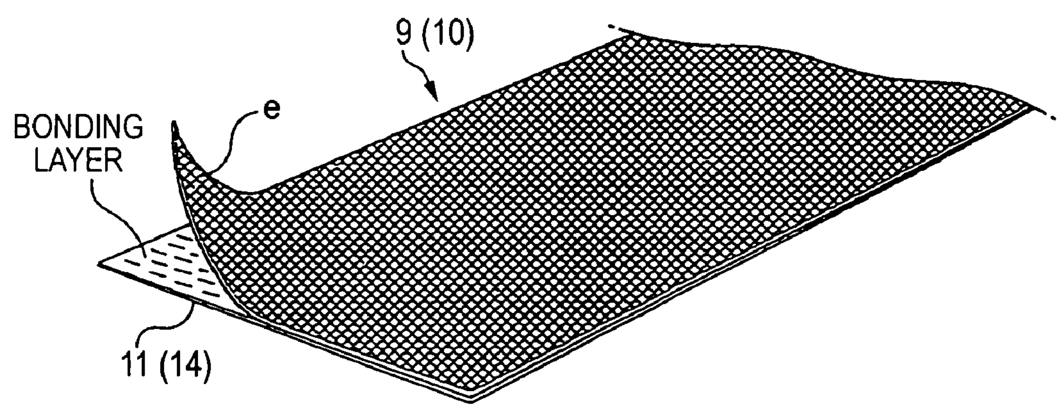
FIGS. 2A and 2B are schematic views of a polarized electrode of an electric double layer capacitor.
Figure 2B:
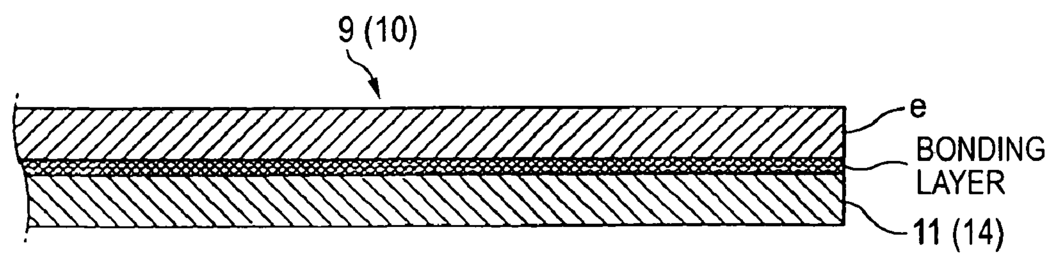

FIG. 1A is a schematic view of an exemplary electric double layer capacitor according to the invention or the prior art, and FIG. 1B is a schematic view of another electric double layer capacitor according to the invention or the prior art. FIGS. 2A and 2B are schematic views of a polarized electrode of an electric double layer capacitor.

The electric double layer capacitor 1 of FIG. 1A is mainly composed of a cylindrical container 2, an electrode roll 3 that is a laminated body of polarized electrodes 9 and 10 and band-shaped separators s (see FIG. 2) and is housed in the container 2, and an electrolytic solution that is provided in the container 2 as a result of injection.

The container 2 is made of aluminum (alloy), for example, to attain high workability and a light weight. The container 2 is composed of a cylindrical main body 4 having a closed bottom and a terminal plate 5 that closes the opening end of the container 2. The terminal plate 5 is provided with a positive terminal 6 and a negative terminal 7. Although in the figure the positive terminal 6 and the negative terminal 7 are provided in the same plane, they may be provided on the opposite sides.

As shown in FIG. 2, the electrode roll 3 has a positive-pole-side, first band-shaped electrode body 9 and a negative-pole-side, second band-shaped electrode body 10.

The first band-shaped electrode body 9 is formed by bonding band-shaped polarized electrodes (i.e., electrode sheets) e to the respective surfaces of a band-shaped collector 11 that is aluminum foil (i.e., collector foil) with a conductive adhesive. The two polarized electrodes e constitute a band-shaped positive electrode (polarized electrode) 12.

The second band-shaped electrode body 10 is formed by bonding band-shaped polarized electrodes (i.e., electrode sheets) e to the respective surfaces of a band-shaped collector 14 that is aluminum foil (i.e., collector foil) with a conductive adhesive. The two polarized electrodes e constitute a band-shaped negative electrode (polarized electrode) 15.

The first band-shaped electrode body 9 and the second band-shaped electrode body 10 is separated from each other by a separator s.

That is, the electrode roll 3 is formed by laminating the polarized electrodes 12 and 15 and the separators s alternately.

The separator used in the invention is not limited to particular ones and separators that are ordinarily used in the technical field concerned can be used in the invention. For example, the separator may be mixed paper that is made from a porous olefin resin (polyethylene or polypropylene) or fiber of cellulose, polyester, or the like.

The electrolytic solution used in the electric double layer capacitor 1 of FIG. 1A is not limited to particular ones and known electrolytic solutions can be used. Exemplary electrolytes are perchloric acid, phosphoric acid hexafluoride, boric acid tetrafluoride, tetraalkylammonium salt or amine salt of trifluoroalkylsulfonic acid, and tetraalkylammonium salt or amine salt of tetrafluoroalkylsulfonic acid.

To form an electrolytic solution, the above electrolytes are dissolved in a polar solvent such as propylene carbonate, γ-butyrolactone, acetonitrile, dimethylformamide, 1,2-dimethoxyethane, sulfolane, or nitroethane.

The electric double layer capacitor 1 of FIG. 1B is a coin-type electric double layer capacitor that is a typical example of an electric double layer capacitor in which polarized electrodes 12 and 15 are used as a laminated body as they are instead of being used like the electrode roll 3. However, the invention is not limited to such a coin-type electric double layer capacitor but covers electric double layer capacitors in which polarized electrodes are used as a laminated body as they are instead of being used as an electrode roll.

In the electric double layer capacitor 1 of FIG. 1B, members having corresponding members in FIG. 1A are given the same reference symbols as the latter and will not be described.

The electric double layer capacitor 1 of FIG. 1B is mainly composed of conductive containers 2 and 2' made of aluminum or the like and a laminated body that consists of polarized electrodes 9 and 10 and a separator s and is housed in the containers 2 and 2'. The separator s is impregnated with an electrolytic solution.

Like the polarized electrodes 9 and 10 shown in FIG. 1A, the positive-pole-side polarized electrode 9 and the negative-pole-side polarized electrode 10 are each a laminated body formed by bonding electrode sheets to the respective surfaces of band-shaped collector foil 11 (or 14) that is aluminum foil with a conductive adhesive (adhesive layer) (also see FIG. 2).

The coin-type electric double layer capacitor 1 is formed by housing the positive-pole-side polarized electrode 9 and the negative-pole-side polarized electrode 10 in the containers 2 and 2' with the separator s interposed in between, the separator s being impregnated with the electrolytic solution. In the thus-configured coin-type electric double layer capacitor 1, the top container 2 that is in contact with the positive-pole-side polarized electrode 9 functions as the positive pole and the bottom container 2' that is in contact with the negative-pole-side polarized electrode 10 functions as the negative pole.

The invention can also be applied to such an electric double layer capacitor.

(Polarized Electrode)

Next, a polarized electrode according to the invention will be described with reference to FIG. 2.

As shown in FIG. 2, the polarized electrode is configured in such a manner that an electrode sheet e (described later) is laminated on one surface or each of the two surfaces of collector foil 11 (or 14) such as aluminum foil.

The collector foil 11 (or 14) maybe subjected to surface treatment such as etching to increase the adhesiveness to the electrode sheet e.

(Electrode Sheet)

In the invention, the electrode sheet by forming, into a sheet, a material composition containing (a) an activated material (50 to 97 mass-%), (b) a conductive filler (1 to 30 mass-%), and (c) a binder (2 to 20 mass-%).

The activated material of the polarized electrode according to the invention is not limited to particular ones and may be activated materials that are used in electrodes of conventional electric double layer capacitors. Activated carbon, carbon fiber, etc. may be used. In particular, to obtain an electric double layer capacitor having a large capacitance, activated carbon or activated carbon fiber having a large specific surface area, preferably, activated carbon such as mesophase carbon obtained by carbonizing an easily-graphitized material and alkali-activating a resulting carbide, can be used as an electrode material of the invention.

The average granule diameter of the activated material is not limited to particular values; activated materials whose average granule diameter is, for example, 1 to 50 μm and preferably about 2 to 15 μm are used. The proportion of the activated material as a constituent material of the electrode sheet is in the range of 50 to 97 mass-% that is a conventional range. If the proportion of the activated material are smaller than this range, a desired capacitance could not be obtained. If, conversely, the proportion of the activated material are larger than this range, the conductivity would be too low. The proportion out of the above range is therefore not preferable.

The conductive filler, which is used to render the electrode sheet conductive, is a conductive fine powder that is ordinarily used in the technical field concerned, such as carbon black. The amount of conductive filler as a constituent material of the electrode sheet according to the invention may be in a conventional range and is 1 to 30 mass-% in general. If the amount of conductive filler are smaller than this range, the conductivity of a resulting electrode sheet would be too low. If, conversely, the amount of conductive filler are larger than this range, the capacitance would be too small. The amount of conductive filler out of the above range is therefore not preferable.

The binder is used for binding the above powdery constituent materials (granulation). Various binders that are known in the technical field concerned may be used in the invention. Exemplary binders that can suitably be used in the invention are fluororesins such as polytetrafluoroethylene (PTFE), an ethylene-tetrafluoroethylene copolymer, a chlorotrifluoroethylene polymer, a vinylidene fluoride polymer, and a tetrafluoroethylene-fluoroalkylvinyl ether copolymer. The binder is not limited to the above examples. Among these binders, from the viewpoints of heat resistance, chemical resistance, etc., it is preferable to use polytetrafluoroethylene (PTFE) as the binder that is used in the invention.

The amount of binder as a constituent material of the electrode sheet according to the invention maybe in a conventional range and is 2 to 20 mass-% in general. If the amount of binder are smaller than this range, the binder function would be insufficient. If, conversely, the amount of binder are larger than this range, the capacitance of a resulting capacitor would be too small. The amount of binder out of the above range is therefore not preferable.

Granules for formation of an electrode of an electric double layer capacitor according to the invention are obtained by kneading and crushing predetermined amounts of electrode materials mentioned above, and are characterized in that their diameter is in a range of 47 to 840 μm.

If the granules for formation of an electrode of an electric double layer capacitor according to the invention included fine granules whose diameters are smaller than 47 μm, fine granules whose diameters are smaller than 47 μm would exist on the sheet surface when an electrode sheet is formed. Those fine granules existing on the surface would be prone to desorb during storage, in post-steps, and in assembling an electric double layer capacitor. In particular, after an electric double layer capacitor is assembled, fine granules whose diameters are smaller than 47 μm would be desorbed and then interposed between the separators or suspended in the electrolytic solution. As a result, the voltage maintenance ratio of the electric double layer capacitor would decrease, which is not preferable.

On the other hand, the upper limit of the granules for formation of an electrode of an electric double layer capacitor according to the invention is set as appropriate in accordance with the thickness of an electrode sheet to be produced. In particular, in the case of a specification for automobiles etc. that requires a high output power, a relatively thin electrode sheet should be produced. The invention employs the value 840 μm that is the upper limit of granules that are used for producing such an electrode sheet.

It is noted that the term "(granule) diameter" as used in the invention means the mesh size of a sieve.

Granules for formation of an electrode of an electric double layer capacitor according to the invention whose diameter is in the prescribed range are formed into a sheet as an electrode sheet according to the invention, and polarized electrodes for an electric double layer capacitor according to the invention are produced by laminating the electrode sheet on collector foil (see FIG. 2). An electric double layer capacitor as shown in FIG. 1A or 1B is manufactured by using the polarized electrodes thus produced. As a result, the problem that fine granules whose diameters are smaller than 47 μm are desorbed and then interposed between the separators or suspended in the electrolytic solution. This provides an advantage that an electric double layer capacitor can be provided that has a small voltage decrease due to self-discharge (i.e., a large voltage maintenance ratio).

(Manufacturing Method)

Figure 3:
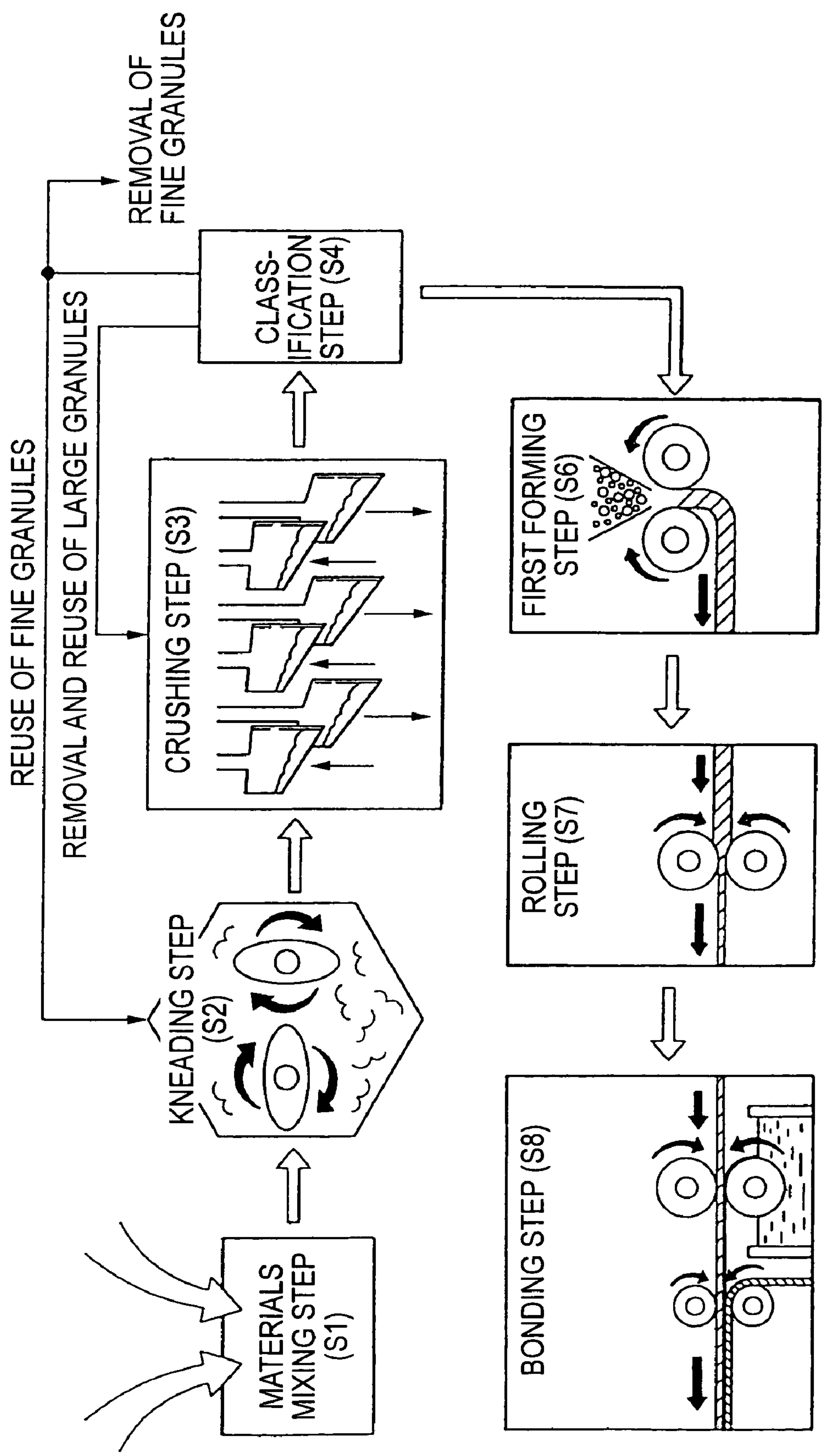
FIG. 3 is a flowchart of a manufacturing method of a polarized electrode of an electric double layer capacitor.
Figure 4:
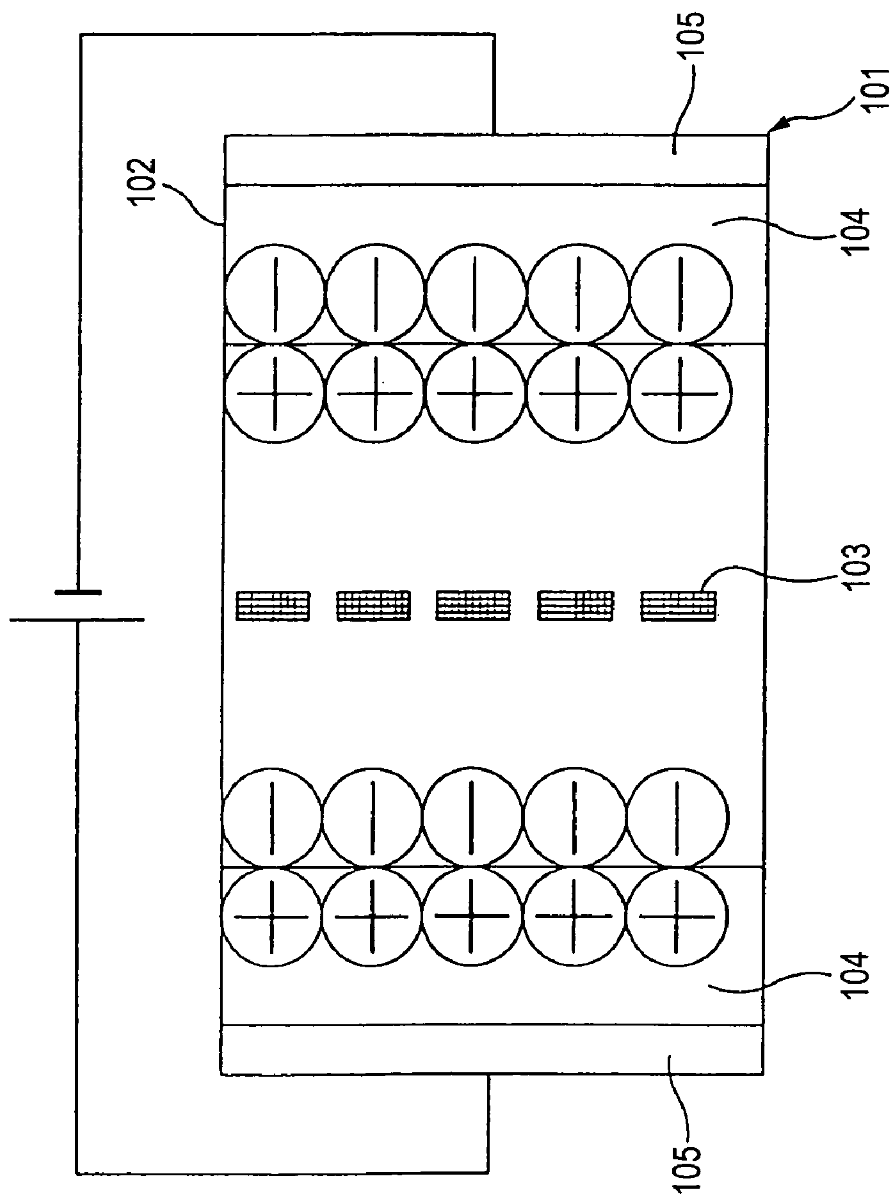
FIG. 4 is a sectional view showing the basic configuration of an electric double layer capacitor.

Next, a manufacturing method of granules for formation of an electrode of an electric double layer capacitor, an electrode sheet, and a polarized electrode according to the invention will be described with reference to FIG. 3. FIG. 3 is a flowchart of a manufacturing method of a polarized electrode of an electric double layer capacitor. However, the invention is not limited to this manufacturing method.

(Materials Mixing Step)

In the invention, first, at step S1, an activated material, a conductive filler, a binder, and additives that are added if necessary, all of which are in powder form, are put into a mixer in a prescribed mixing ratio and are dispersed uniformly in a mixture (e.g., by stirring those at a rotation speed of thousands of rotations per minute for about 20 minutes).

(Kneading Step)

Subsequently, a mixture of the materials that are dispersed uniformly at step S1 is kneaded with a kneader, preferably, a biaxial kneader as shown in FIG. 3, at a high temperature (e.g., 60 to 90° C.) under a low pressure (e.g., 0.2 to 0.5 MPa) at low rotation speeds (e.g., about 10 to 40 rpm) for several minutes (e.g., 8 minutes). After the mixture of the materials is kneaded under the prescribed conditions in the kneading step S2, the binder is fibrillated to bond the activated material and the conductive filler together and relatively large electrode granules are thereby formed.

(Crushing Step and Classification Step)

At step S3, the relatively large granules produced at the kneading step S2 are crushed into sizes that are suitable for granules for an electrode of an electric double layer capacitor.

The granules produced by the crushing at the crushing step S3 include granules that are not suitable for formation of an electrode, that is, fine granules and large granules. In the invention, the segranules are removed at step S4. For example, granules whose diameters are larger than 840 μm are removed by classifying the granules produced at step S3 by using a sieve having a mesh size of 840 μm. It is preferable that the removed granules whose diameters are larger than 840 μm be returned to the crushing step S3 and be crushed again there. Granules for formation of an electrode of an electric double layer capacitor according to the invention whose diameter is in the prescribed range can be obtained by removing fine granules by using a sieve having a mesh size of 47 μm, for example. The removed granules may be returned to the kneading step S2 and used for forming new granules.

Although in the above example the above classification order is such that fine granules are removed after large granules are done, the order may be reversed. That is, in the invention, the classification order is not limited to any particular order.

(First Forming Step)

In the invention, granules for formation of an electrode of an electric double layer capacitor according to the invention are produced in the above-described manner by steps S1–S4. The electrode formation granules thus produced are formed preliminarily at the next step S6 into an electrode pre-sheet.

An electrode pre-sheet can be produced by a known method in which, for example, the granules for formation of an electrode of an electric double layer capacitor according to the invention and a solvent such as isopropanol are caused to pass between a pair of rollers having a prescribed gap.

(Rolling Step)

Subsequently, at step S7, the electrode pre-sheet is formed into an electrode sheet having a prescribed thickness by a known method, that is, by causing it to pass between rolls. For example, as shown in FIG. 3, if it is desired to produce an electrode sheet having a sheet thickness of 130 to 160 μm, the electrode pre-sheet is caused to pass between three pairs of rolls having different roll gaps (the gap decreases downstream), whereby its thickness is decreased gradually. Decreasing the sheet thickness step by step makes it possible to prevent damage such as cracking of the sheet because no heavy load is imposed on the electrode pre-sheet in its thickness direction at a single position.

Although in the rolling step S7 of the invention an electrode sheet is produced by causing an electrode pre-sheet to pass between plural pairs of rolls successively, producing an electrode sheet by causing an electrode pre-sheet to pass between separately provided pairs of rolls is naturally covered by the invention.

The thus-produced electrode sheet according to the invention contains the granules for formation of an electrode of an electric double layer capacitor according to the invention whose diameter is in the prescribed range because of the removal of fine granules and large granules. Therefore, no fine granules exist on the surface of the electrode sheet.

(Bonding Step)

Then, at step S8, a polarized electrode according to the invention is formed by bonding the electrode sheet to collector foil such as aluminum foil. As shown in FIG. 3, this is done by a bonding line that is equipped with first rolls for taking an adhesive from an adhesive container and applying the adhesive to the collector foil at a prescribed thickness and second rolls for bonding the electrode sheet to the collector foil to which the adhesive is applied at the prescribed thickness by the first rolls.

To form a polarized electrode according to the invention by laminating the electrode sheet on each of the two surfaces of the collector foil, step S8 is executed for each of the two surfaces of the collector foil.

The polarized electrode according to the invention in which the electrode sheet to one surface or each of the two surfaces of the collector foil is dried by an ordinary method and a final product is thereby obtained.

Although the above description is directed to the case that a polarized electrode that is a laminated body of the collector foil and the electrode sheet is formed by using the conductive adhesive, a polarized electrode may be formed by pressure-bonding the collector foil and the electrode sheet together without intervention of an adhesive.

The invention will be described below by using Embodiments. However, the invention is not limited to those Embodiments.

(Embodiment 1)

Activated carbon is used as an activated material. The activated carbon, acetylene black as a conductive filler, and Teflon (registered trademark) as a binder are mixed with each other at a ratio of 84:8:8. Isopropanol is added to a resulting mixture and they are pressure-kneaded, whereby the Teflon is fibrillated and a kneaded material is obtained. The kneaded material is crushed, whereby a crushed powder having an average diameter of about 0.5 mm is obtained.

The crushed powder is sifted with a mesh, whereby fine granules whose diameters are smaller than 75 μm are removed. A resulting powder is given isopropyl alcohol and then subjected to calendering, whereby a sheet-like formed body is obtained. The sheet-like formed product is rolled into an electrode sheet. The electrode sheet is bonded to an aluminum collector, whereby an electrode body is formed. An adhesive G-5780 A produced by No-tape Industrial Co., Ltd. is used for the bonding.

The thus-obtained electrode body is cut into electrodes having a prescribed length, which are wound together with two separators having a thickness of about 50 μm. A resulting roll is enclosed in a test cell and subjected to vacuum drying at 160° C. for 72 hours. A propylene carbonate solution of a quaternary ammonium salt (density: 1.8 mol/l) is injected as an electrolytic solution to form a cell.

Impregnation is effected by increasing the temperature of the thus-obtained cell to 60° C. After prescribed aging treatment is performed for defoaming, charging is performed to 2.5 V. A voltage after a lapse of 312 hours is measured, and a voltage maintenance ratio is calculated by using that voltage. A result is shown in Table 2.

(Embodiment 2)

A cell is produced by a capacitor manufacturing process that is the same as described above except that granules whose diameters are smaller than 53 μm are removed. The cell is subjected to a similar test. A result is shown in Table 2.

(Comparative Example 1)

A cell is produced by a capacitor manufacturing process that is the same as described above except that granules whose diameters are smaller than 38 μm are removed. The cell is subjected to a similar test. A result is shown in Table 2.

(Comparative Example 2)

A cell is produced by a capacitor manufacturing process that is the same as described above except that no fine granules are removed. The cell is subjected to a similar test. A result is shown in Table 2.

As a preliminary experiment, a crushed powder obtained after granulation is classified into powders of below 47 μm, 47 to 100 μm, and above 100 μm and their properties after forming into an electrode sheet are measured.

TABLE 1

Table: Diameters and electrode properties of granulated powders

| | Electrode strength ($N/cm^2$) | Electrode density (g/cc) |
|---|---|---|
| Below 47 μm | 20286 | 0.58 |
| 47 to 100 μm | 30460 | 0.66 |
| Above 100 μm | 31458 | 0.67 |

As seen from Table 1, the electrode sheet produced from the crushed powder whose granule diameter is smaller than 47 μm is very weak and is low in density. It is thus found that the bonding of the crushed powder whose granule diameter is smaller than 47 μm is weak. It is highly probably that the weak bonding adversely affects the forming performance. Further, granules are prone to be desorbed or suspended in the electrolytic solution.

TABLE 2

Voltage maintenance ratio after a lapse of 312 hours

| | Voltage maintenance ratio (%) |
|---|---|
| Embodiment 1 | 92 |
| Embodiment 2 | 92 |
| Comparative Example 1 | 86 |
| Comparative Example 2 | 84 |

It is found that removing fine granules whose diameter is smaller than 47 μm as in Embodiments 1 and 2 decreases the amount of desorbed granules and hence makes it possible to obtain a-large voltage maintenance ratio. In contrast, the voltage-maintenance ratio after a lapse of 312 hours is very low in Comparative Example 1 in which fine granules whose diameter is smaller than 38 μm are removed (i.e., fine granules whose diameter is grater than or equal to 38 μm are present) and Comparative Example 2 in which no fine granules are removed.

As described above, the invention provides the following superior advantages.

According to aspect 1, a carbon fine powder or fine particles of a conductive filler etc. are not peeled of for desorbed and then suspended in an electrolytic solution or interposed between separators. This makes it possible to produce an electrode of an electric double layer capacitor that has a large voltage maintenance ratio.

According to aspect 2, granules for formation of an electrode of an electric double layer capacitor in which a carbon fine powder or fine particles of a conductive filler etc.

are not peeled off or desorbed and then suspended in an electrolytic solution or interposed between separators can be manufactured easily.

According to aspect 3, an electrode of an electric double layer capacitor in which a carbon fine powder or fine particles of a conductive filler etc. are not peeled off or desorbed and then suspended in an electrolytic solution or interposed between separators and that has a large voltage maintenance ratio and hence can exhibit stable performance can be obtained.

According to aspect 4, a carbon fine powder or fine particles of a conductive filler etc. are not peeled off or desorbed and then suspended in an electrolytic solution or interposed between separators. Therefore, when the electrode is incorporated in an electric double layer capacitor, a large voltage maintenance ratio can be attained. This makes it possible to produce an electric double layer capacitor that can supply a stable voltage and is highly durable.

According to aspect 5, an electric double layer capacitor that has a large voltage maintenance ratio and is highly durable can be obtained.

Further, an embodiment of the present invention will be hereinafter described with reference to the drawings.

Figure 5:
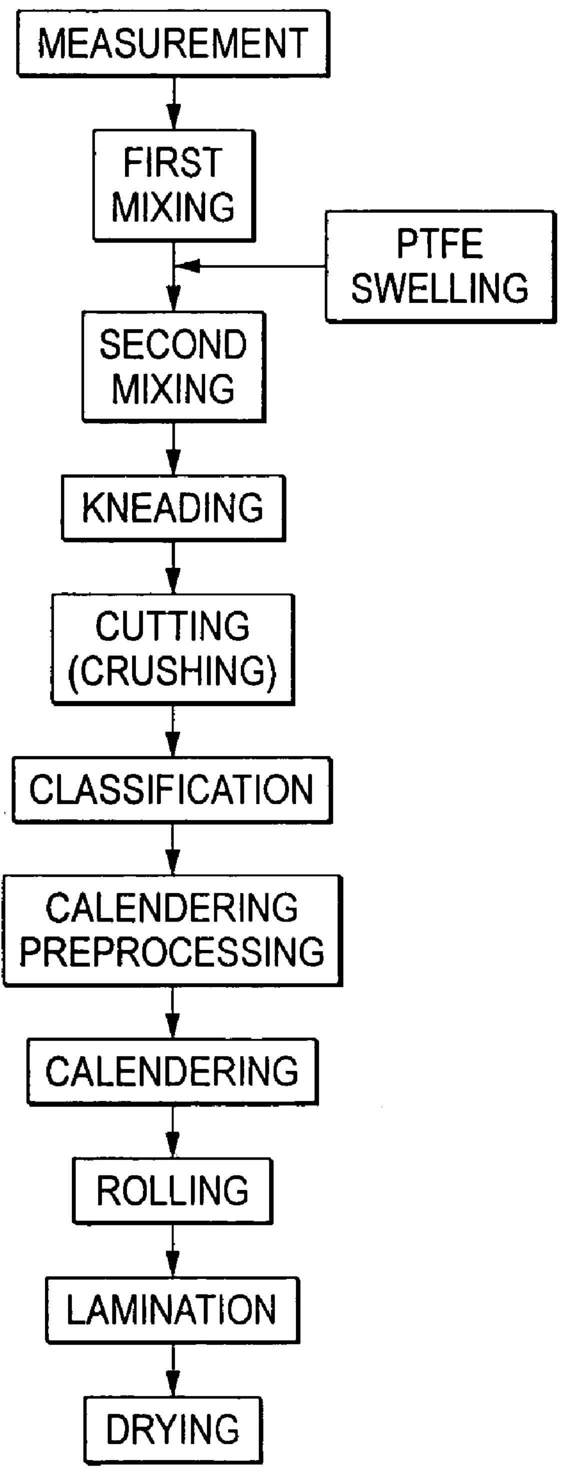
FIG. 5 shows a manufacturing process of an electrode sheet of an electric double layer capacitor according to an embodiment of the invention.

FIG. 5 shows a manufacturing process of an electrode sheet of an electric double layer capacitor. Materials that are used for manufacture of a polarized electrode are activated carbon as a carbonaceous powder, carbon black as a conductivity-enhancing agent, and a PTFE powder as a binder, and liquid IPA (isopropyl alcohol) as a binder-assisting agent. As for the mixing ratio (weight percentage) of the materials, activated carbon, carbon black, and PTFE account for 80%, 10%, and 10%, respectively. IPA is added by the same amount (corresponds to 10%) as the amount of PTFE.

First, the individual materials are subjected to measurement. Then, activated carbon and carbon black are put into a mixer container and are mixed with each other by rotary stirring blades (first mixing), whereby they are mixed with each other with as high a degree of uniformity as possible.

Then, swelled PTFE that is obtained by mixing with IPA is put into the mixer container, and is thereby mixed with a mixture obtained by the first mixing (second mixing). As a result, not only are the activated carbon, carbon black, and PTFE are mixed with each other but also the PTFE is fiberized and twined around the activated carbon and carbon black.

Subsequently, a mixture obtained by the second mixing is put into a kneader container. After a lid is put on the container, the mixture is kneaded by rotating the blades while being pressurized. As a result, the mixture is kneaded into clay-like form and the PTFE is further fiberized and twined around the activated carbon and carbon black. During the kneading, the kneader container, the lid, and the blades are temperature-controlled to 90°, for example.

Figure 6:
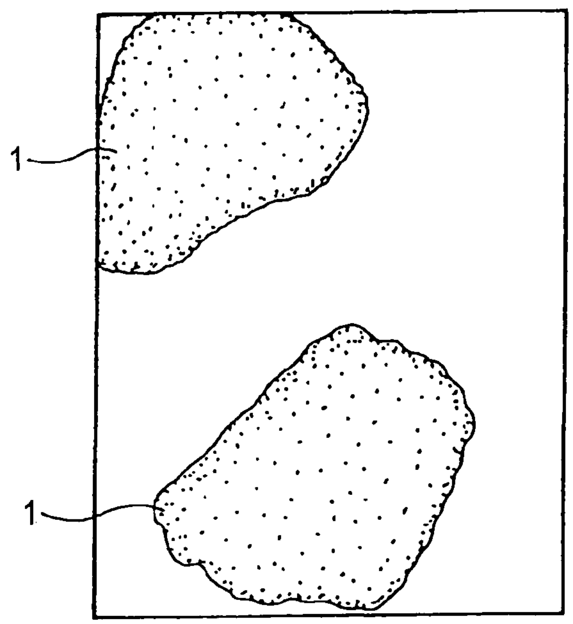
FIG. 6 shows generally glomerate granules obtained by cutting a kneaded mixture.
Figure 7:
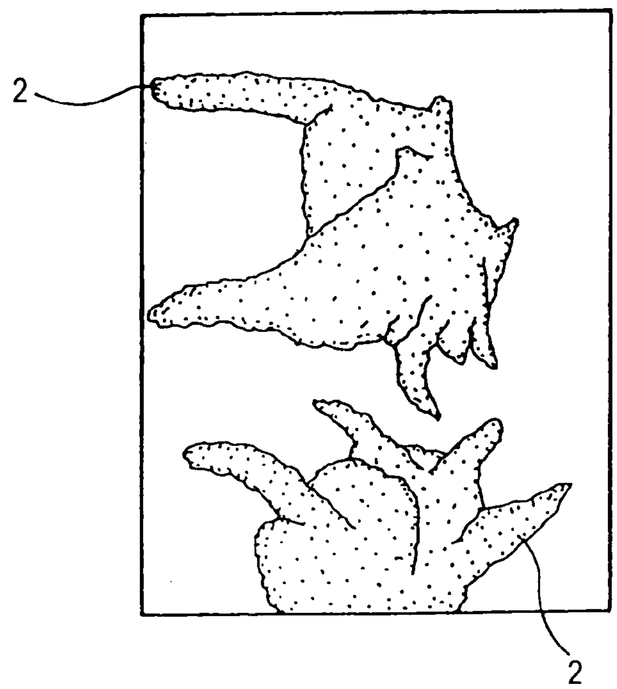
FIG. 7 shows granules having whisker-like projections.

Then, a mixture obtained by the mixing using the kneader is put into a cutting machine container and cut into granules with rotary cutting blades. As shown in FIG. 6, it is preferable that the resulting granules 201 be generally glomerate and have no whisker-like projections. FIG. 7 shows an undesirable case in which granules 202 have whisker-like projections.

Then, the granules obtained by the cutting are classified by sifting those. They are classified by using plural kinds of sifting meshes of #200 (granules whose diameter is smaller than 47 μm drop) to #20 (granules whose diameter is smaller than 840 μm drop), whereby granules whose diameter is larger than or equal to 47 μm and smaller than 840 μm are obtained and will be used as a forming material. The diameter profile of the forming material will be described later.

Figure 8:
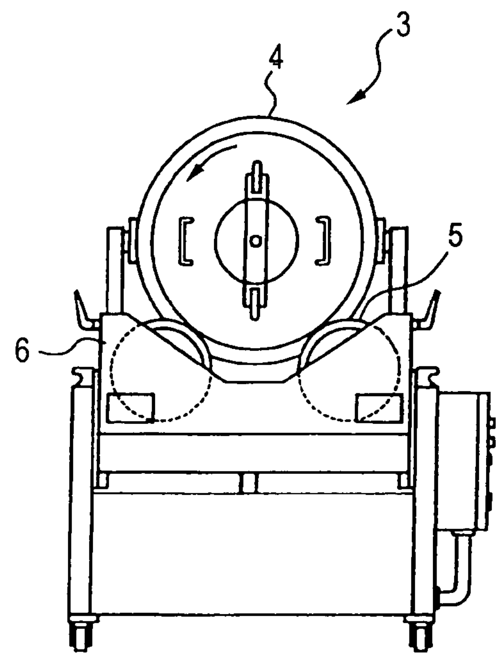
FIG. 8 is a side view of a mixer.

Subsequently, in a calendering preprocessing step, the forming material is put into a container 204 of a mixer 203 (see FIG. 8). IPA that weighs 70% of the total weight of the original materials (activated carbon, carbon black, and PTFE) is added to and mixed with the forming material. The container 204 is generally cylindrical and can be closed tightly. The container 204 can be rotated in the circumferential direction by rollers 205 and can be moved up and down in the vertical direction together with a stage 206. The granular forming material and the liquid IPA in the tightly closed container 204 are mixed with each other with the mixer 203 with as high a degree of uniformity as possible.

Then, in a calendering step, a mixture including the forming material obtained by the mixing using the mixer 203 is put into a hopper of a calender and caused to pass between two rollers. The mixture is formed into a sheet-like formed body, which is wound around a take-up roller. The thickness of the sheet-like formed body is set to 200 μm, for example.

Then, in a rolling step, the sheet-like formed body is rolled by causing it to pass between two rollers. The sheet-like formed body is subjected to the rolling step plural times, whereby a sheet-like electrode having a prescribed thickness, for example, 160 μm is obtained as a polarized electrode. At the final stage of the rolling, both end portions, in the width direction, of the sheet-like electrode are cut away with a cutter.

Figure 9:
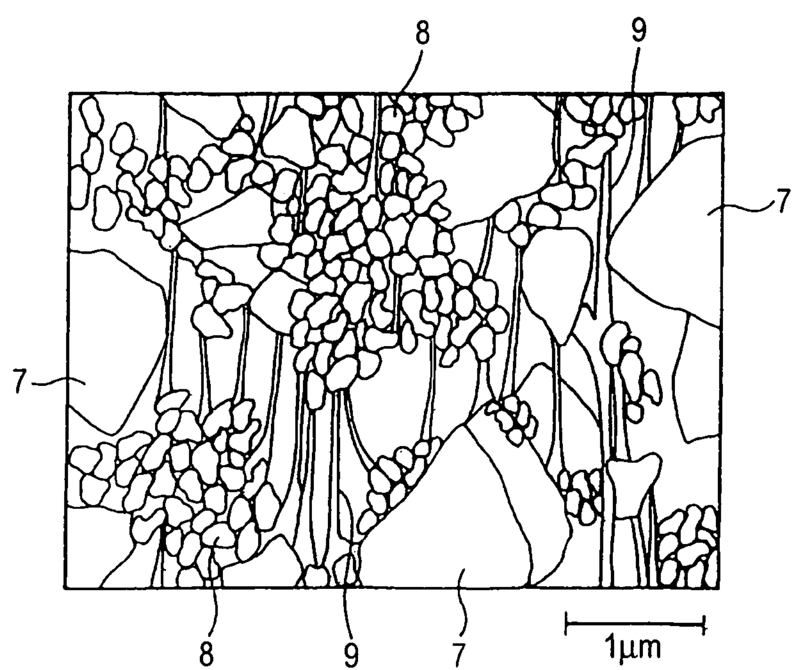
FIG. 9 schematically shows the surface of a sheet-like electrode.

FIG. 9 schematically shows the surface of a sheet-like electrode. As seen from FIG. 9, fibrous PTFE 209 twines around activated carbon portions 207 and carbon black portions 208 that are smaller than the activated carbon portions 207.

Subsequently, in a lamination step, the rolled sheet-like electrode is bonded to aluminum foil as a collector. A resulting electrode sheet is wound around a take-up roller.

Then, in a drying step, water and residual IPA that are contained in the sheet-like electrode are removed. Vacuum drying may be performed if necessary.

To investigate the relationship between the diameter profile of the above-described granular forming material and the density and tensile strength of the sheet-like electrode, the inventors conducted the following experiment. First, as shown in the following Table 3, forming materials of Embodiments 3–7 and Comparative Example 3 having different diameter profiles are prepared. As for the shapes of the forming materials, all the granules of Embodiments 3–7 had no whisker-like projections (FIG. 6) and the granules of Comparative Example 3 had whisker-like projections (see FIG. 7). As described above, the granules of Embodiments 3–7 and Comparative Example 3 had the same diameter range that the diameter is larger than or equal to 47 μm and smaller than 840 μm and had different diameter profiles. The total weight is 500 g in all of Embodiments 3–7 and Comparative Example 3.

TABLE 3

| | | 実施例1 | | 実施例2 | | 実施例3 | | 実施例4 | | 実施例5 | | 比較例1 | |
|---|---|---|---|---|---|---|---|---|---|---|---|---|---|
| メッシュ | 粒径(μm) | 割合(%) | 重さ(g) | 割合(%) | 重さ(g) | 割合(%) | 重さ(g) | 割合(%) | 重さ(g) | 割合(%) | 重さ(g) | 割合(%) | 重さ(g) |
| #24~#20 | 728~840 | 27 | 135 | 12.5 | 62.5 | 2 | 10 | 1 | 5 | 26 | 130 | 1 | 5 |
| #30~#24 | 637~728 | 20 | 100 | 12.5 | 62.5 | 4 | 20 | 7 | 35 | 20 | 100 | 7 | 35 |
| #32~#30 | 544~637 | 15 | 75 | 12.5 | 62.5 | 11 | 55 | 8 | 40 | 11 | 55 | 8 | 40 |
| #40~#32 | 445~544 | 12 | 60 | 12.5 | 62.5 | 20 | 100 | 10 | 50 | 4 | 20 | 10 | 50 |
| #60~#40 | 343~445 | 10 | 50 | 12.5 | 62.5 | 26 | 130 | 12 | 60 | 2 | 10 | 12 | 60 |
| #70~#60 | 243~343 | 8 | 40 | 12.5 | 62.5 | 20 | 100 | 15 | 75 | 6 | 30 | 15 | 75 |
| #110~#70 | 141~243 | 7 | 35 | 12.5 | 62.5 | 11 | 55 | 20 | 100 | 13 | 65 | 20 | 100 |
| #200~#110 | 47~141 | 1 | 5 | 12.5 | 62.5 | 6 | 30 | 27 | 135 | 18 | 90 | 27 | 135 |
| 合計 | | 100(%) | 500(g) | 100(%) | 500(g) | 100(%) | 500(g) | 100(%) | 500(g) | 100(%) | 500(g) | 100(%) | 500(g) |

The sifting mesh (JIS mesh) have finer meshes when its number is larger. In Table 3, the entry "#24–#20," for example, in the column "mesh" means granules that are in such a range as to pass through the #20 mesh and not to pass through the #24 mesh. The other entries "#30–#24" etc. mean ranges that are defined in the same manner. The entry "728–840," for example, in the column "granule diameter" means a range that the diameter is larger than or equal to 728 μm and smaller than 840 μm. The other entries "637–728" etc. mean ranges that are defined in the same manner.

The forming materials of Embodiments 3–7 and Comparative Example 3 are formed into sheets, which are roller into sheet-like electrodes. Table 4 shows results of density measurements and tensile tests that are performed on the sheet-like electrodes thus obtained. The testing conditions of the tensile tests are as follows. The test sample piece assumed a plate-like shape measuring 15 mm in width, 0.14 mm in thickness, and 100 mm in length. Held by a chuck at both ends, the sample piece is pulled in the vertical direction (single axis) at a speed of 5 mm/min.

TABLE 4

| | Density (g/cm$^3$) | Tensile strength (MPa) |
|---|---|---|
| Embodiment 3 | 0.727 | 0.35 |
| Embodiment 4 | 0.725 | 0.33 |
| Embodiment 5 | 0.726 | 0.32 |
| Embodiment 6 | 0.723 | 0.26 |
| Embodiment 7 | 0.728 | 0.27 |
| Comparative Example 3 | 0.700 | 0.20 |

Consideration will be given to the above results. As far as the density is concerned, the differences between Embodiments 3–7 and Comparative Example 3 are very small, the density value of Comparative Example 3 is smaller than the density values of Embodiments 3–7. This is considered due to the difference in the granule shape of the forming material. That is, it is considered that whereas interstices do not tend to develop between generally glomerate granules without whisker-like projections, interstices tend to occur between granules with whisker-like projections to lower the density.

To enable continuous execution of each of the rolling step and the lamination step, it is preferable that the tensile strength is higher than 0.25 MPa. All of Embodiments 3–7, in which the tensile strength is higher than or equal to 0.26 MPa, satisfy this requirement. In contrast, Comparative Example 3 (tensile strength: 0.20 MPa) does not satisfy this requirement. It is therefore concluded that a polarized electrode that is high in tensile strength can be manufactured by using, as a forming material, granules that are generally glomerate, have no whisker-like projections, and are in a diameter range that the diameter is larger than or equal to 47 μm and smaller than 840 μm. It is noted that no porosities or cracks occurred when the forming materials of Embodiments 3–7 are formed into sheets.

Further consideration of the results of Embodiments 3–7 tells that the tensile strength is higher than or equal to 0.32 Pa in Embodiments 3–5 and lower than or equal to 0.27 in Embodiments 6 and 7 (i.e., lower than in Embodiments 3–5). The inventors studied the reason for this difference and found that it relates to the diameter profile of the formed material. Among Embodiments 3–7, the proportion of granules having small diameters (i.e., larger than or equal to 47 μm and smaller than 243 μm) is high in Embodiment 6 (47%=20%+27%) and Embodiment 7 (31%=13%+18%). In contrast, the proportion of granules having small diameters (i.e., larger than or equal to 47 μm and smaller than 243 μm) is 8% (7%+1%) in Embodiment 3, 25% (12.5%+12.5%) in Embodiment 4, and 17% (11%+6%) in Embodiment 5; that is, the proportion is lower than 30% in Embodiments 3–5. From these results it can be said that it is even preferable in terms of the sheet tensile strength that the proportion of the granules of the forming material whose diameter is larger than or equal to 47 μm and smaller than 243 μm is lower than or equal to 30%.

In the above embodiment, when IPA is added to and mixed with a granular forming material before the forming material is formed into a sheet, the IPA and the forming material are mixed with each other in the container 204 that is closed tightly. As a result, they can be handled without changing the content of the IPA and hence can be mixed with each other with as high a degree of uniformity as possible. This in turn makes it possible to stabilize the quality of the forming material and to manufacture even better sheet-like electrodes.

What is claimed is:

1. Granules for formation of an electrode of an electric double layer capacitor which are obtained by kneading and then crushing materials including an activated material, a conductive filler, and a binder at 50 to 97 mass-%, 1 to 30 mass-%, and 2 to 20 mass-%, respectively, wherein the granules for formation of an electrode are essentially granules whose diameter is in a range of 47 to 840 μm.

2. A manufacturing method of granules for formation of an electrode of an electric double layer capacitor, comprising the steps of:

(a) producing material lumps by kneading materials including an activated material, a conductive filler, and a binder at 50 to 97 mass-%, 1 to 30 mass-%, and 2 to 20 mass-%, respectively, and fibrillating the binder;

(b) producing crushed granules by crushing the material lumps;

(c) classifying the crushed granules to remove granules whose diameters are larger than 840 μm; and (d) classifying the crushed granules to remove granules whose diameters are smaller than 47 μm.

3. The electrode sheet for an electric double layer capacitor which is produced by forming the granules for formation of an electrode of an electric double layer capacitor according to claim 1 into a sheet.

4. The polarized electrode for an electric double layer capacitor, wherein the electrode sheet for an electric double layer capacitor according to claim 3 is laminated on electrode foil with or without intervention of a bonding layer.

5. The electric double layer capacitor comprising:

the polarized electrode for an electric double layer capacitor according to claim 4.

6. A manufacturing method of a polarized electrode for an electric double layer capacitor for manufacturing a sheet-like polarized electrode for an electric double layer capacitor comprising the steps of:

mixing and kneading materials including a carbonaceous powder, a conductivity-enhancing agent, and a binder into a kneaded material, producing a forming material by converting the kneaded material into granules, and forming and rolling the forming material, wherein the granules as the forming material produced from the kneaded material are generally glomerate and are in a diameter range that the diameter is larger than or equal to 47 μm and smaller than 840 μm.

7. The manufacturing method of a polarized electrode for an electric double layer capacitor according to claim 6, wherein the forming material is such that a proportion of granules whose diameter is smaller than 243 μm is smaller than or equal to 30% of all the granules.

8. The manufacturing method of a polarized electrode for an electric double layer capacitor according to claim 6, wherein when a binder-assisting agent is added to and mixed with the forming material before the forming material is formed into a sheet, the binder-assisting agent and the forming material are mixed with each other in a tightly closed container.

* * * * *